US012621813B2

(12) United States Patent
Portnik et al.

(10) Patent No.: US 12,621,813 B2
(45) Date of Patent: May 5, 2026

(54) DOWNLINK CONTROL INFORMATION TO SCHEDULE DOWNLINK DATA ON PHYSICAL CHANNEL AND ENHANCE CONTROL CHANNEL DECODING

(71) Applicant: Dell Products L.P., Round Rock, TX (US)

(72) Inventors: Ilya Portnik, Ashton (CA); Eran Goldstein, Montreal (CA); Jayaram Venguduswamy Srinivasan, Nepean (CA); Libin Jose Meledam, Nepean (CA)

(73) Assignee: DELL PRODUCTS L.P., Round Rock, TX (US)

( * ) Notice: Subject to any disclaimer, the term of this patent is extended or adjusted under 35 U.S.C. 154(b) by 294 days.

(21) Appl. No.: 18/485,750

(22) Filed: Oct. 12, 2023

(65) Prior Publication Data

US 2025/0126608 A1 Apr. 17, 2025

(51) Int. Cl.
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
CPC .......................... H04W 72/0446; H04W 72/23
See application file for complete search history.

(56) References Cited

U.S. PATENT DOCUMENTS

2022/0053471 A1* 2/2022 Shen ...................... H04W 72/20
2025/0132860 A1 4/2025 Portnik et al.
2025/0220630 A1* 7/2025 Zheng ................. H04W 64/003

FOREIGN PATENT DOCUMENTS

WO 2018/144852 8/2018

OTHER PUBLICATIONS

International Search Report and Written Opinion for PCT Application No. PCT/US2024/013884 mailed Jun. 21, 2024, 14 pages.

* cited by examiner

*Primary Examiner* — Melvin C Marcelo
(74) *Attorney, Agent, or Firm* — Amin, Turocy & Watson, LLP

(57) ABSTRACT

The technology described herein is directed towards informing user equipment of which physical downlink control channel (PDCCH) locations in a slot symbol are allocated for (PDCCH) information. With the user equipment having this allocation information, a base station (e.g., gNodeB) scheduler can schedule unused PDCCH resource element group(s) to a UE for physical downlink shared channel (PDSCH) decoding. Further, because the allocation pattern is known to a UE, the UE need not blindly scan and decode all potential resource element groups in a slot, instead only decoding the PDCCH data in the allocated pattern to find the UE-specific information, and thereby proceed with PDSCH decoding. A defined identifier at a predefined symbol location informs the user equipment when the PDCCH allocation information is present. If not present, the UE blindly decodes all the resource element groups to find the UE-specific information to decode PDSCH data, as is currently done.

20 Claims, 11 Drawing Sheets

| Value (hexadecimal) | Radio Network Temporary Identifier (RNTI) |
|---|---|
| 0000 – FFF2 | RA-RNTI, MSGB-RNTI, Temporary C-RNTI, C-RNTI, CI-RNTI, MCS-C-RNTI, CS-RNTI, TPC-PUCCH-RNTI, TPC-PUSCH-RNTI, TPC-SRS-RNTI, INT-RNTI, SFI-RNTI, SP-CSI-RNT1, PS-RNT1, SL-RNTI, SLCS-RNTI S1 Semi-Persistent Scheduling V-RNT1, AI-RNTI, G-RNTI, and G-CS-RNT |
| FFF3 - FFFB | Reserved |
| FFFC | PEI-RNT |
| FFFD | MCCH-RNTI |
| FFFE | P-RNTI |
| FFFF | SI-RNTI |

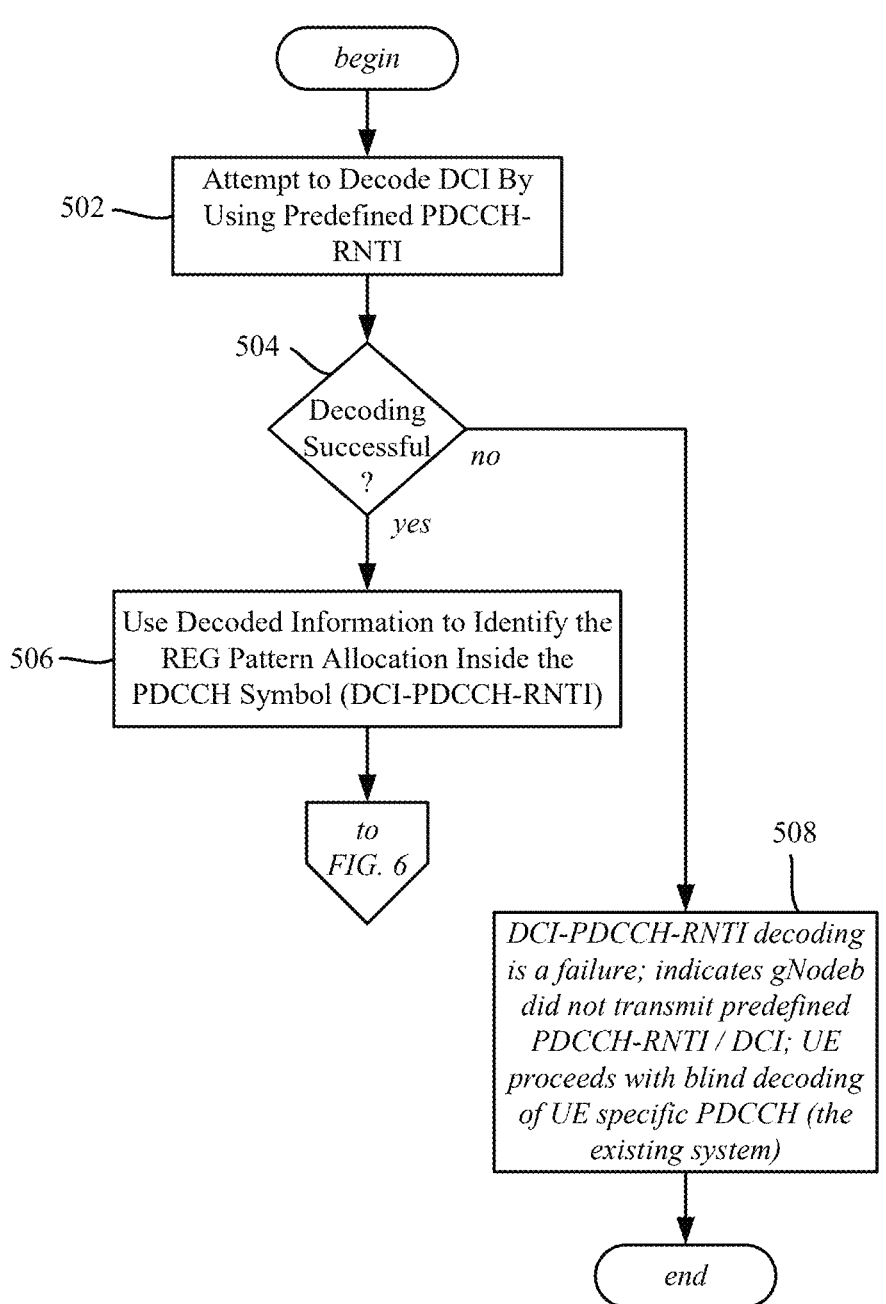

begin

502 — Attempt to Decode DCI By Using Predefined PDCCH-RNTI

504 — Decoding Successful ?

no yes

506 — Use Decoded Information to Identify the REG Pattern Allocation Inside the PDCCH Symbol (DCI-PDCCH-RNTI)

to FIG. 6

508 — *DCI-PDCCH-RNTI decoding is a failure; indicates gNodeb did not transmit predefined PDCCH-RNTI / DCI; UE proceeds with blind decoding of UE specific PDCCH (the existing system)* end

FIG. 5

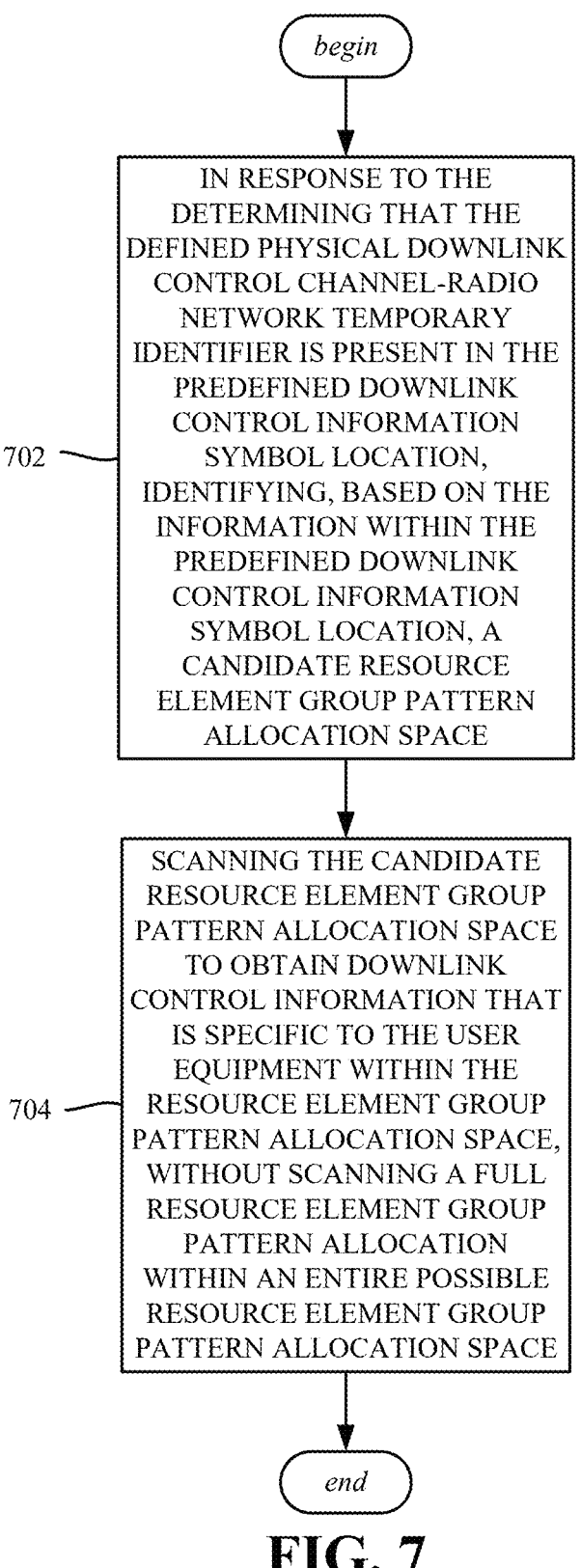

begin

702 — IN RESPONSE TO THE DETERMINING THAT THE DEFINED PHYSICAL DOWNLINK CONTROL CHANNEL-RADIO NETWORK TEMPORARY IDENTIFIER IS PRESENT IN THE PREDEFINED DOWNLINK CONTROL INFORMATION SYMBOL LOCATION, IDENTIFYING, BASED ON THE INFORMATION WITHIN THE PREDEFINED DOWNLINK CONTROL INFORMATION SYMBOL LOCATION, A CANDIDATE RESOURCE ELEMENT GROUP PATTERN ALLOCATION SPACE

704 — SCANNING THE CANDIDATE RESOURCE ELEMENT GROUP PATTERN ALLOCATION SPACE TO OBTAIN DOWNLINK CONTROL INFORMATION THAT IS SPECIFIC TO THE USER EQUIPMENT WITHIN THE RESOURCE ELEMENT GROUP PATTERN ALLOCATION SPACE, WITHOUT SCANNING A FULL RESOURCE ELEMENT GROUP PATTERN ALLOCATION WITHIN AN ENTIRE POSSIBLE RESOURCE ELEMENT GROUP PATTERN ALLOCATION SPACE end

FIG. 7 begin

802 — INSERTING, BY RADIO EQUIPMENT COMPRISING A PROCESSOR, A DEFINED IDENTIFIER INTO A SYMBOL AT A PHYSICAL DOWNLINK CONTROL CHANNEL SYMBOL LOCATION

804 — TRANSMITTING, BY THE RADIO EQUIPMENT, THE SYMBOL AS PART OF A PHYSICAL DOWNLINK CONTROL CHANNEL COMMUNICATION TO RECEIVING USER EQUIPMENT end

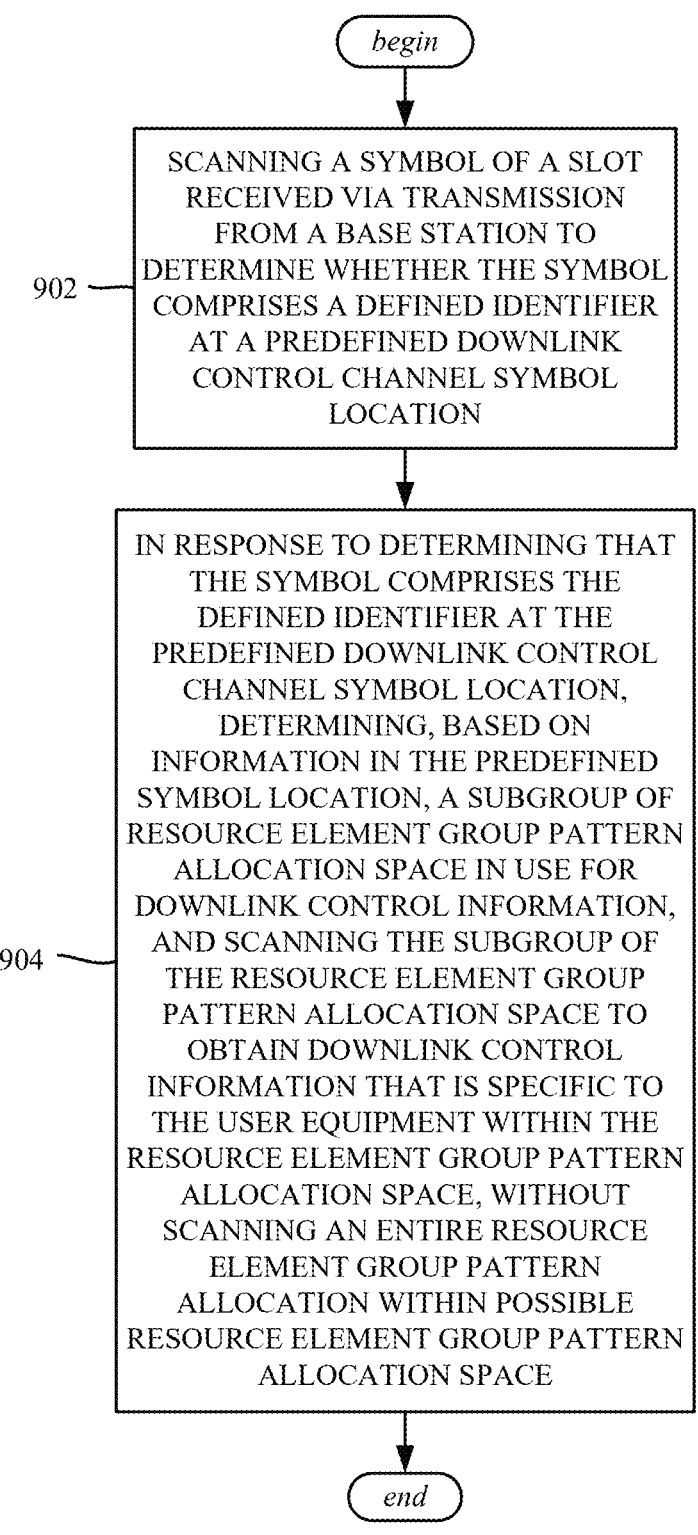

begin

902 — SCANNING A SYMBOL OF A SLOT RECEIVED VIA TRANSMISSION FROM A BASE STATION TO DETERMINE WHETHER THE SYMBOL COMPRISES A DEFINED IDENTIFIER AT A PREDEFINED DOWNLINK CONTROL CHANNEL SYMBOL LOCATION

904 — IN RESPONSE TO DETERMINING THAT THE SYMBOL COMPRISES THE DEFINED IDENTIFIER AT THE PREDEFINED DOWNLINK CONTROL CHANNEL SYMBOL LOCATION, DETERMINING, BASED ON INFORMATION IN THE PREDEFINED SYMBOL LOCATION, A SUBGROUP OF RESOURCE ELEMENT GROUP PATTERN ALLOCATION SPACE IN USE FOR DOWNLINK CONTROL INFORMATION, AND SCANNING THE SUBGROUP OF THE RESOURCE ELEMENT GROUP PATTERN ALLOCATION SPACE TO OBTAIN DOWNLINK CONTROL INFORMATION THAT IS SPECIFIC TO THE USER EQUIPMENT WITHIN THE RESOURCE ELEMENT GROUP PATTERN ALLOCATION SPACE, WITHOUT SCANNING AN ENTIRE RESOURCE ELEMENT GROUP PATTERN ALLOCATION WITHIN POSSIBLE RESOURCE ELEMENT GROUP PATTERN ALLOCATION SPACE end

FIG. 9

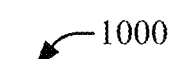
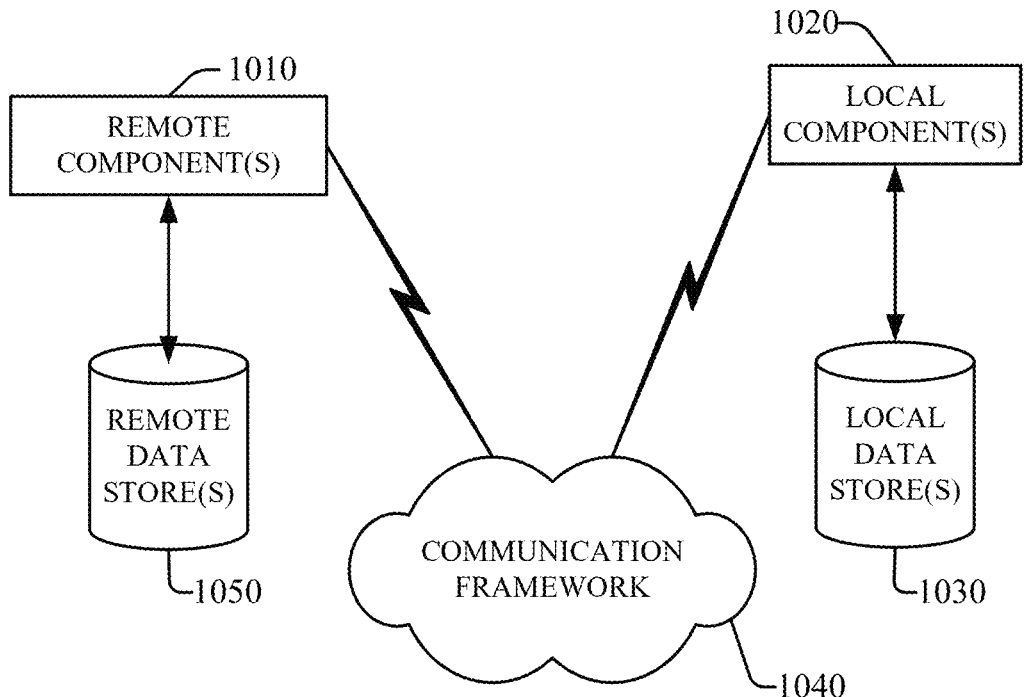
FIG. 10

DOWNLINK CONTROL INFORMATION TO SCHEDULE DOWNLINK DATA ON PHYSICAL CHANNEL AND ENHANCE CONTROL CHANNEL DECODING

BACKGROUND

In New Radio (e.g., fifth generation (5G) systems and beyond), there are two main channels used in the downlink to send data to a user equipment (UE), namely the physical downlink control channel (PDCCH) and the physical data shared channel (PDSCH). PDCCH is used for sending location data in time and frequency, and also for conveying other parameters related to decoding the PDSCH. In general, the PDSCH contains the actual data for the UE. More particularly, a UE decodes the PDCCH data to get the allocation pattern and the configuration data, and, with this information, the UE decodes the PDSCH channel to obtain the payload.

PDCCH is blind decoding, e.g., as per standard, the resource blocks are combined into a resource element group (resource block group). Based on the aggregation level, a number of resource element groups are used to transmit PDCCH data. More particularly, a UE scans all the resource element groups and all aggregation levels to decode the UE-specific data using the radio network temporary identifier (RNTI) allocated to the UE. The UE also decodes data for a common RNTI, that is, to decode data that is in common for the UE and other UEs, e.g., system information block 1 (SIB), paging, broadcast messages, and the like. It is time and resource consuming for a UE to scan and decode all the resource element groups and with all aggregation levels inside the PDCCH symbol to find any matching data for the UE's specific RNTI and the common RNTI.

BRIEF DESCRIPTION OF THE DRAWINGS

The technology described herein is illustrated by way of example and not limited in the accompanying figures in which like reference numerals indicate similar elements and in which:

FIG. 2 is a representation of an example data structure in which physical downlink control information can be sent, including a radio network temporary identifier indicating the presence of the predefined DCI within a slot symbol, in accordance with various aspects and implementations of the subject disclosure.

FIGS. 5 and 6 comprise flow diagram showing example operations related to user equipment operations related to DCI decoding, in accordance with various aspects and implementations of the subject disclosure.

FIG. 7 is a flow diagram showing example operations related to scanning candidate resource element group pattern allocation space to obtain downlink control information specific to a user equipment based on the presence of defined identifier in a predefined downlink control information symbol location, in accordance with various aspects and implementations of the subject disclosure.

FIG. 9 is a flow diagram showing example operations related to determining a subgroup of resource element group pattern allocation space in use for downlink control information based on information in a predefined symbol location, and scanning the subgroup of the resource element group pattern allocation space to obtain downlink control information that is specific to the user equipment, in accordance with various aspects and implementations of the subject disclosure.

FIG. 10 is a block diagram representing an example computing environment into which aspects of the subject matter described herein may be incorporated.

DETAILED DESCRIPTION

Figure 1:
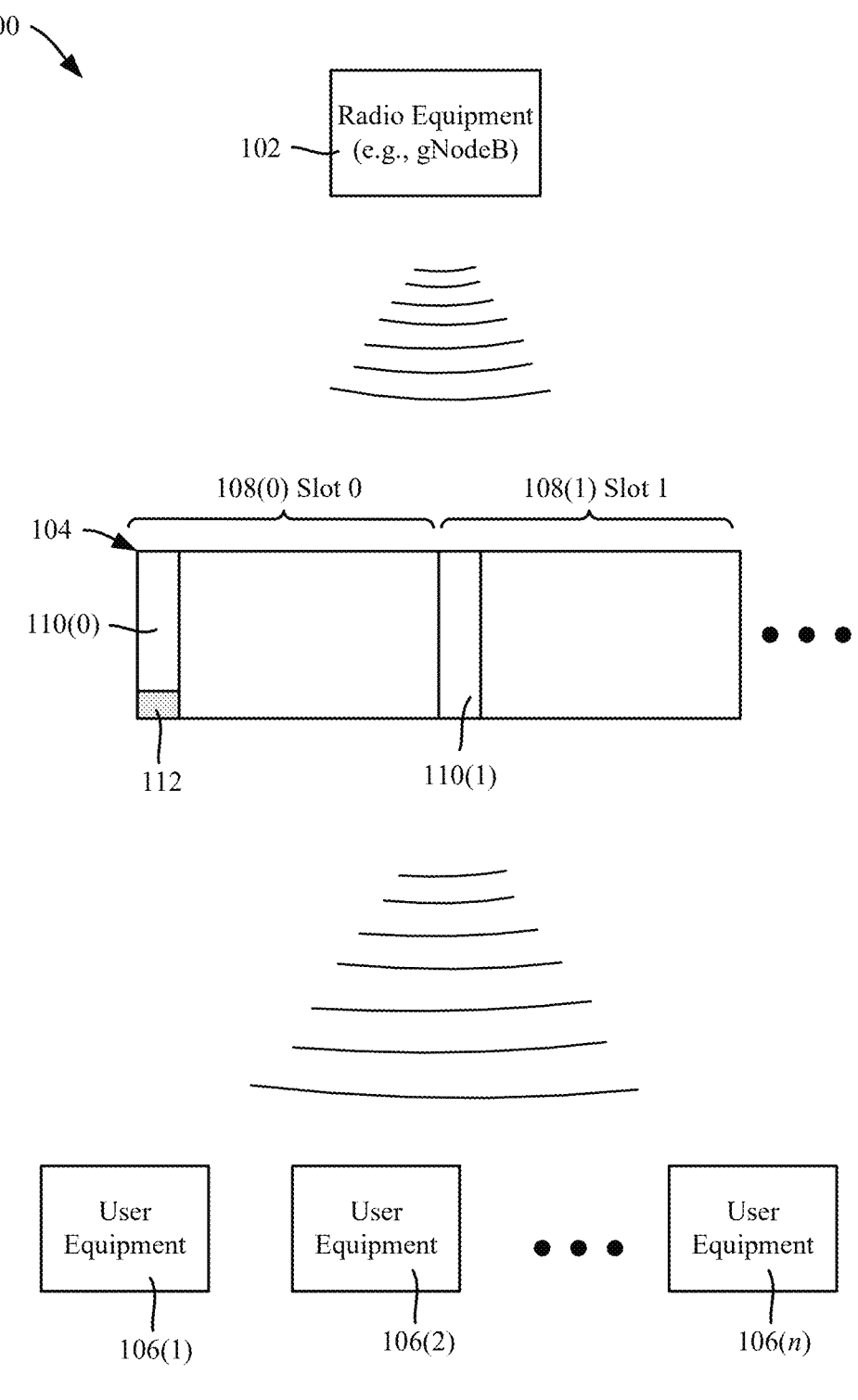
FIG. 1 is an example block diagram representation of an example system/architecture in which radio equipment sends downlink control information (DCI) in a slot that includes a predefined DCI within a slot symbol that contains resource group occupancy data for specific user equipment, in accordance with various aspects and implementations of the subject disclosure.

Various aspects of the technology described herein are generally directed towards informing user equipment (one or more UEs) of physical downlink control channel (PDCCH) information (DCI) on the fixed control channel element (CCE), containing resource element group (REG) allocation (e.g., a bitmap of REG-allocated or unused REG locations with respect to DCI). With the user equipment having this allocation information, a base station (e.g., gNodeB) scheduler can schedule unused resource element group to a UE for physical downlink shared channel (PDSCH) decoding.

In one example implementation, described herein is adding predefined downlink control information (PDCCH-DCI), which contains the resource element group pattern allocated in the slot. This PDCCH-DCI is encoded with a specified/defined PDCCH radio network temporary identifier (PDCCH-RNTI), which is common data to be decoded by any receiving UE (e.g., similar to system information/SI-RNTI). When the PDCCH-RNTI is present, via the DCI a UE knows the PDCCH allocation pattern.

Because the pattern is known to a UE, the UE need not scan and decode all resource element groups in a slot, instead only decoding the PDCCH in the allocated pattern to find the UE-specific RNTI DCI information, and thereby proceed with PDSCH decoding. Often the slots will have relatively few resource element groups, whereby a UE need not decode all resource element groups, but rather only the candidate subgroup of (the few) resource element groups to find a UE-specific RNTI message. In the event that that all the resource element groups are allocated in a slot, the PDCCH-DCI is not present at the predefined symbol location, whereby (as is currently done) the UE decodes all the resource element groups to find the UE-specific information to decode PDSCH data.

Further, when the PDCCH allocation pattern is known, a scheduler can reuse the otherwise unused resource element groups to send data on the same symbol, utilizing the unused resource element groups for the PDSCH data. The UE will discard the resource element groups used for PDCCH and determine the remaining resource element group(s) used for PDSCH data.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimization," "optimize" or "optimal" and the like (e.g., "maximize," "minimize" and so on) only represent objectives to move towards a more optimal state, rather than necessarily obtaining ideal results.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows an example system/architecture 100, which in this example has radio equipment 102 such as a gNodeB communicating downlink control information 104 to user equipment 106(1)-106($n$) via a number of slots, including slots 108(0) and 108(1). Each of the slots 108(0) and 108(1) are composed of symbols, and in the example of FIG. 1 the first symbols of the slots 108(0) and 108(1) are labeled 110(0) and 110(1), respectively, and used for DCI-PDCCH data.

As described herein, in this example the symbol 110(0) has additional DCI in a predefined symbol location 112, which is used to schedule downlink data on the PDCCH symbol and enhance PDCCH decoding. More particularly, the predefined symbol location 112 contains information (e.g., a bitmap) indicating which other REGs within the symbol/slot are used for DCI information directed to the user equipment (UEs) 106(1)-106($n$).

Via the information in the predefined symbol location 112, any receiving user equipment 106(1)-106($n$) knows the resource element group allocation that is in use by every user equipment inside a slot. Because the UEs have this information, a scheduler for the radio equipment 102 can schedule any of the unused resource element groups to any of the UEs 106(1)-106($n$). In other words, because the PDCCH allocation pattern is known to the user equipment 106(1)-106($n$), a scheduler can reuse the unused resource element group to send data on the same symbol, utilizing the unused resource element groups for PDSCH data. When done scanning, a UE discards the DCI-used resource element group and determines/calculates the remaining resource element group for PDSCH data.

Further, because the user equipment 106(1)-106($n$) knows the resource element group allocation via the information in the predefined symbol location 112, a given user equipment (e.g., 106(2)) need not scan the entire symbol space to determine which other locations in the symbol contain DCI information directed to that user equipment 106(2). Instead, only the subgroup of symbol locations that contain DCI information need to be scanned to determine which of the symbol location(s) are relevant to that user equipment 106(2).

In one implementation, when present (e.g., the gNodeB decides whether or not to use the predefined DCI), the predefined DCI information (PDCCH-DCI) at the predefined symbol location contains a specifically-defined identifier, PDCCH-RNTI. The user equipment looks for this defined identifier, and if present, knows that the PDCCH-DCI, also carries the (e.g., bitmap of) the resource element group pattern allocated in the slot.

More particularly, this predefined DCI is encoded with the predefined RNTI (PDCCH-RNTI), and is common data to be decoded by all the UE to obtain the PDCCH allocation pattern. Adding this additional DCI does consume some resource elements to transfer the predefined message, however the gain of using otherwise unused resource element groups when utilized for scheduling PDSCH data increases the overall throughput of the system.

In one implementation, because this is a predefined message that uses a common RNTI, the predefined message can be not included by the base station on an as-needed basis. If this predefined DCI is not present, the UE fails to decode the DCI, and proceeds with the current 5G NR method to scan all the resource element groups in order to find the UE-specific information for decoding PDSCH data. In this way a gNodeB/scheduler can control predefined DCI message based on the load conditions, for example.

To be located, the predefined DCI message needs to be in a specifically-defined resource element group and aggregation level to ensure that the UE does not perform blind decoding to try and find this message. In one implementation, the predefined DCI message is added in CORESET 0 and CCE index 0, which is the first (lowest) location of DCI in a slot/symbol. Notwithstanding, any location can be used as long as the base station and UEs are coordinated with respect to the predefined DCI message location in use.

With respect to aggregation, in general, the UE decodes PDCCH to get the allocation pattern and the configuration as described herein. Using these information, the UE decodes the PDSCH channel to get the payload. PDCCH can be blind or partially-blind decoding (of only the identified PDCCH DCI subgroups in a symbol as described herein), as per 5GNR standard six continuous resource element groups are treated as one CCE (where a resource element group is equal to one resource block during one OFDM symbol).

| Symbol No. | Aggregation level | Number of CCEs | No. of REs for PDCCH | No of REs for PDCCH-DMRS |
|---|---|---|---|---|
| 1. | 1 | 1 | 9 | 3 |
| 2. | 2 | 2 | 18 | 6 |
| 3. | 4 | 4 | 36 | 12 |
| 4. | 8 | 8 | 72 | 24 |
| 5. | 16 | 16 | 144 | 48 |

Thus, the total number of resource blocks consumed for a DCI, can be computed as: Total number of resource blocks used=Aggregation level*6. For example, if there is only one UE in a slot, and the number of the PDCCH symbol is 1, then for aggregation level 4, the number of resource blocks used for PDCCH=24. In general, for aggregation level 4, 24

RBs from symbol 0 are used for sending the PDCCH data, and symbols from 1 to 13 are used for PDSCH data scheduling.

In sum, to implement the technology described herein in one example implementation, the system (gNodeB) can add the predefined DCI on any slot (e.g., in the first symbol), when desired by the gNodeB. The predefined DCI conveys the resource element group mapping used in the system for the user PDCCH, which provides control on every slot on a slot-by-slot basis. The UE attempts to decode, and success-fully decodes this information only when it is present, and thereby takes advantage of the information to decode actual PDCCH messages directed to the UE. This reduces the overhead of blindly scanning across the entire resource element group, and also provides the scheduler with an opportunity to allocate unused resource element groups for downlink data to increase overall throughput.

This is in contrast to prior systems, in which blind decoding is performed, whereby there is no opportunity for the scheduler to allocate unused resource element groups because a UE does not know whether or not there are unused resource element groups in a symbol nor the purpose of a resource element group, e.g., whether for another UE's PDCCH or for PDSCH data. The PDSCH overlaps only with the same RNTI's PDCCH information; one reason for this is that a given UE can decode the PDCCH resource element group present in the PDCCH symbol, and the UE can skip those resource element groups while processing the PDSCH information. However, if another UE's information occupies the current UE PDSCH resource blocks, without the tech-nology described herein a current UE does not know how many resource element groups are occupied and hence the PDSCH decoding will be a problem.

A PDSCH can use the unused PDCCH resource element group to send PDSCH data. Because no other PDCCH data is occupied on PDCCH symbol (0), the UE decodes PDCCH, ignores the resource element group used for PDCCH and uses the remaining resource element group for decoding PDSCH data. Similarly, two or more users can occupy the PDCCH unused resource element group, as long as the PDCCH for one UE does not fall under other user's PDSCH data. Thus, there are many possible problems with attempting to use unused PDCCH symbol locations for PDSCH data if the UEs do not know which ones are for PDCCH data and which ones are for PDSCH data; the technology described herein overcomes such issues.

In general, the location of PDCCH is dependent on RNTI, CORESET, CCE candidate index, slot number CCE Map-ping type, resource element group bundle size and resource element groupshift value. The scheduler has to take care of all these cases and map the PDCCH so that it does not overlap with another user. This impacts UE0 PDSCH decod-ing, if UE 0 does not know about existence of the UE 1 PDCCH resource element group, the decoding cannot skip those resource element group and whereby PDSCH decod-ing is a problem.

Consider an example case with two user equipment with interleave enabled in the PDCCH symbol, and in which there are two PDCCH locations in the symbol with follow-ing configurations, and only blind decoding is available:

CORESET 1 with BWP start 0 and end 273.

CCE resource element group mapping-Interleaved.

resource element group Bundle size—2.

Interleave size—3.

Aggregation level—4.

In this blind decoding example, UE0 and UE1 cannot use unused resource element group from symbol 0 (PDCCH).

There are many other possible cases with combination of number of users per slot, interleave pattern, Slot number, RNTI number and CORESET. In those cases, a scheduler cannot use the unused resource element group from PDCCH to allocate that group for PDSCH. Thus, in such cases the scheduler has to ignore the PDCCH symbol (e.g., symbol 0) and let the PDSCH occupy only the space of symbols 1 to 13. The technology described herein overcomes such issues by informing the UEs of which locations in the defined PDCCH symbol are used for PDCCH data and which are not used for PDCCH data (and thus available for PDSCH data scheduling).

In conventional systems, there is no information about resource element group occupancy inside the PDCCH sym-bol. In contrast, by adding DCI information as described herein with a predefined RNTI (a common RNTI to any UE), e.g., called PDCCH-RNTI, to one of the reserved RNTI can be used for PDCCH-RNTI; for example 65531 (FFFB in hexadecimal) can be used for this purpose (al-though a different value can be decided upon standardiza-tion). FIG. 2 shows the current mapping of RNTI (data structure 220) in which 65531 is currently reserved.

Figure 3:
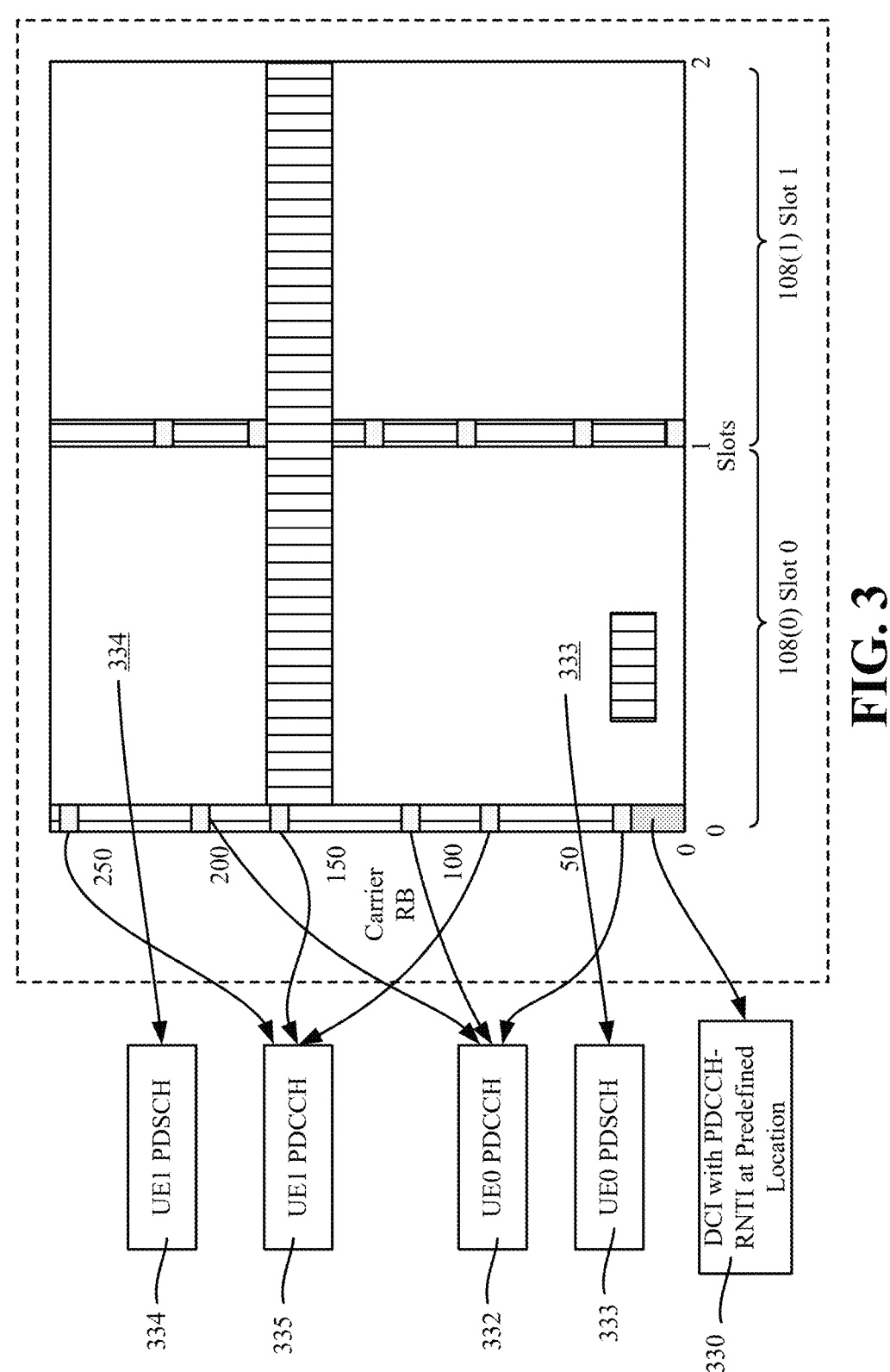
FIG. 3 is a representation of an example pattern of resource allocation with the predefined DCI present within a slot symbol, in accordance with various aspects and implementations of the subject disclosure.

Using this RNTI a predefined DCI is transmitted, which informs about resource element group occupancy inside the PDCCH symbol. For example, compared to prior systems, FIG. 3 shows a predefined DCI 330 added to the PDCCH symbol (0, in the dark shaded block) with PDCCH-RNTI; to reiterate, because this is a common RNTI, any UE can decode this data. This DCI data 330 contains the resource element group occupancy bit pattern, whereby using this information, any UE knows the resource element group allocation pattern inside the PDCCH symbol (the lightly-shaded blocks in symbol 0). Because the UE knows the resource element group allocation list, the UE need not perform a full blind decoding, but rather can perform a partial blind decoding using the allocation list (only scan-ning the PDCCH lightly-shaded blocks in symbol 0) to find which of the resource element groups are specific to the scanning UE. In FIG. 3, upon the partial blind decoding the UE0 determines that UE0 PDCCH data 332 has three of the shaded blocks specific to UE0; similarly, the UE1 deter-mines that UE1 PDCCH data 332 has three other of the shaded blocks specific to UE1. As can be seen, instead of searching the area, the search area is limited to allocation list, whereby fully blind decoding is replaced with partial blind decoding using the known resource element group list within the data of block 330.

For completeness, note that UE0 PDSCH is represented by the unshaded slot space corresponding to label 333, and UE1 PDSCH is represented by the unshaded slot space corresponding to label 334. Further, the blocks with vertical striping represents Synchronization Signal (SS) burst regions. Because every UE knows the resource element group allocation list, a UE can determine unused resource element group inside the PDCCH symbol. As such, unused (with respect to PDCCH) resource element groups can be allocated to PDSCH for a UE. The UE can not only use resource element group list information to skip the used resource element group, but can also use the remaining resource block locations for rate matching the PDSCH information. In this way both the gNodeB and the UE will use same rate matching pattern for successful PDSCH transmission and decoding.

Figure 4:
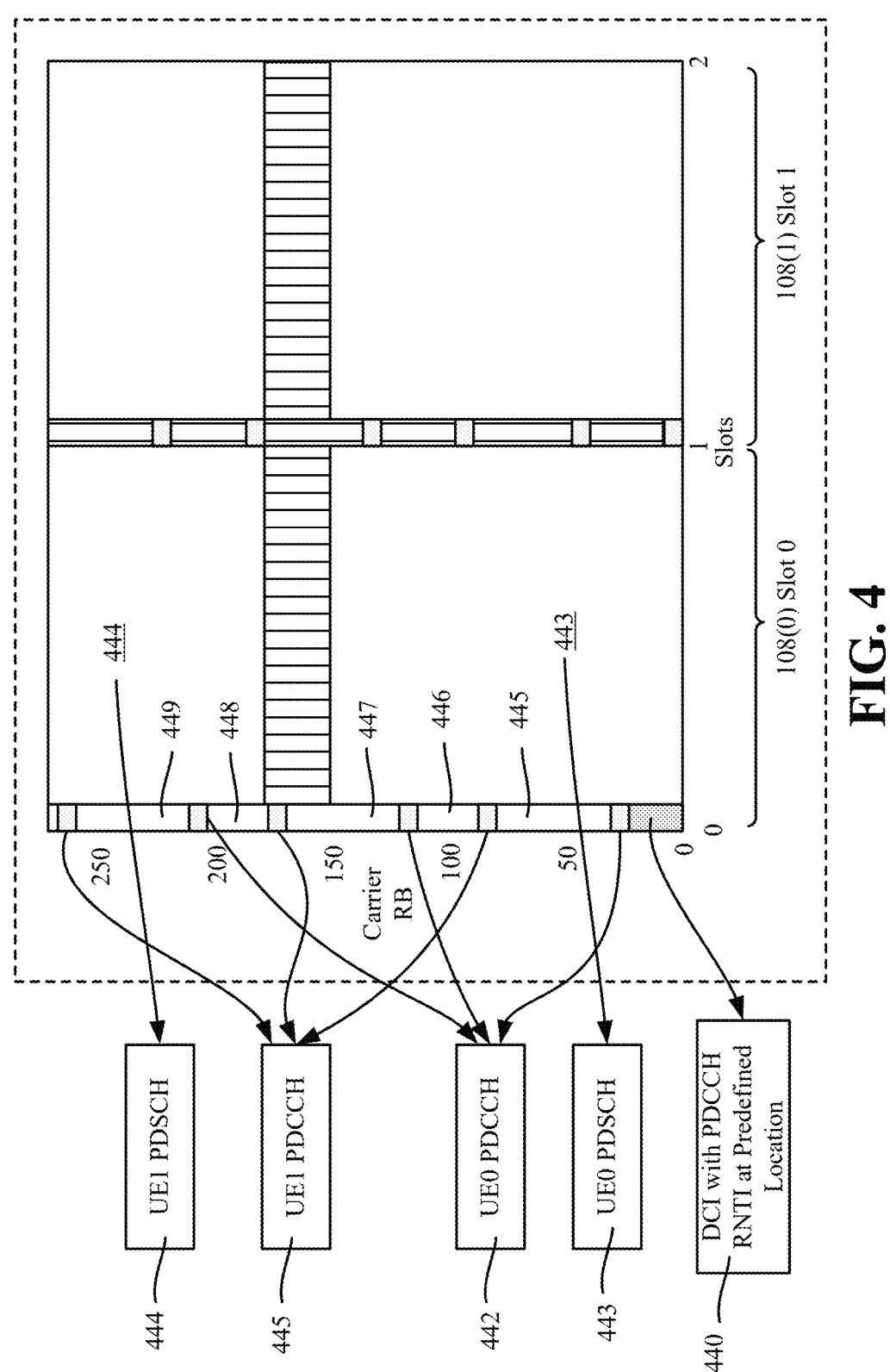
FIG. 4 is a representation of another example pattern of resource allocation based on the presence of the predefined DCI within a slot symbol, in accordance with various aspects and implementations of the subject disclosure.

FIG. 4 shows an example pattern of allocation with predefined DCI 440 (darker shaded block) to enable a scheduler and UE to use the otherwise unused RBs for PDSCH allocation. Note that for purposes of this example, slot 0 (108(0)) is enabled with the predefined PDCCH-RNTI in the defined location and slot 1 (108(1)) is a conventional slot without the predefined PDCCH DCI. Because slot 0 has the predefined DCI 440, both UE0 and UE1 know the used and unused (unused at least for PDCCH) resource element group. Using this used resource element group information, the UE0 decodes PDCCH specific to the UE0, namely block 442 and the corresponding lightly-shaded regions (with curved arrows to block 442). Similarly, the UE1 decodes PDCCH specific to the UE1, namely block 444 and the corresponding lightly-shaded regions (with curved arrows to block 444). The PDCCH data for each UE provides the PDSCH allocation pattern for that UE. That is, using the unused resource element group pattern the UE can determine the PDSCH RBs from the PDCCH symbol, and decoding can be performed with proper rate matching.

Significantly, as shown in FIG. 4, not only are the (unshaded) regions 443 and 444 available for PDSCH data, but also the (unshaded) regions 445-449. Via the technology described herein, this otherwise unused space is now available to the scheduler for scheduling PDSCH RBs to either UE0 or UE1, as the scheduler deems appropriate.

Figure 6:
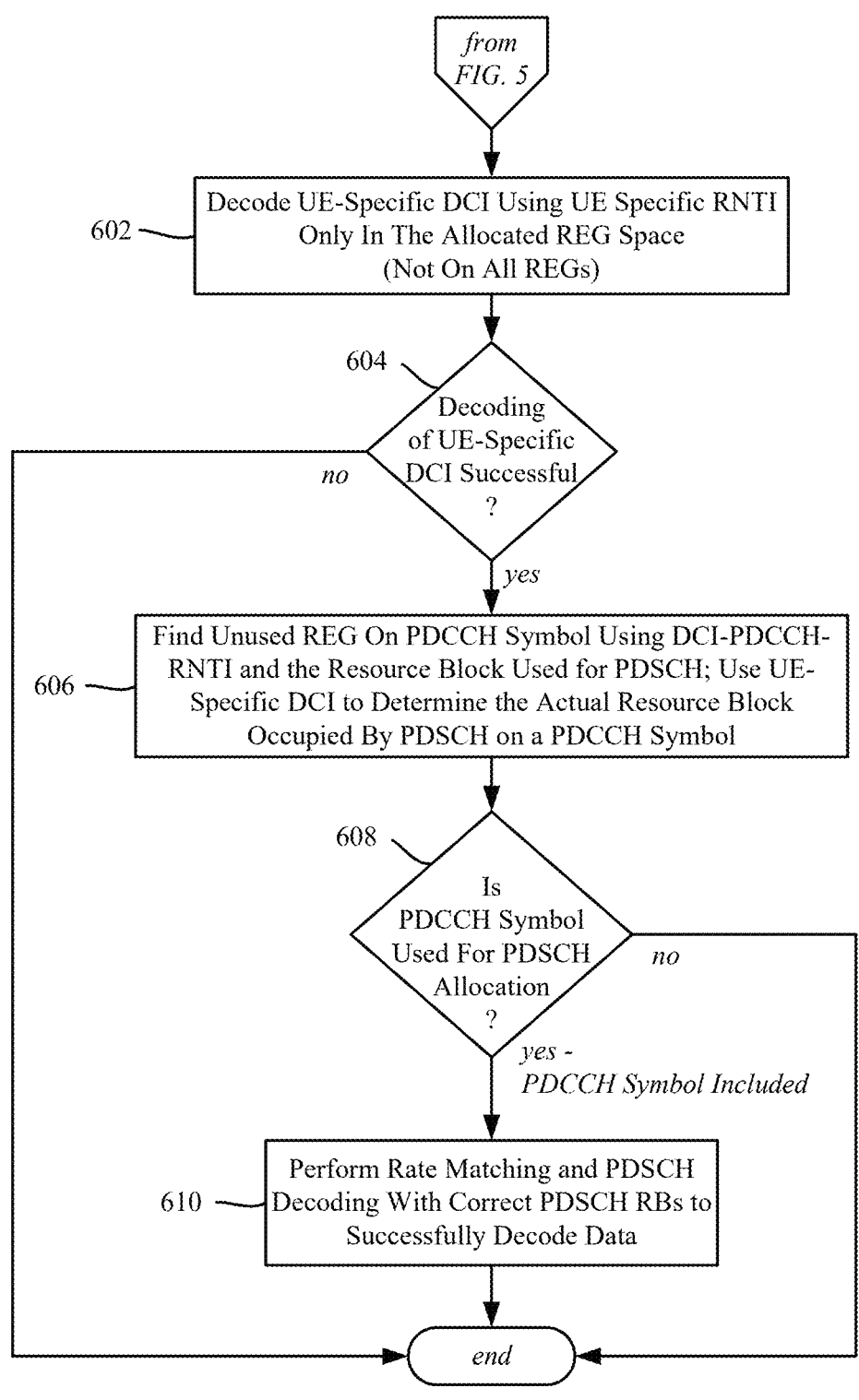

FIGS. 5 and 6 show example operations representing general logic for a UE once the slots/symbols are received. At operation 502 of FIG. 5, the UE first attempts to decode DCI by using specific/defined PDCCH-RNTI, at the predefined symbol and symbol location. If the decoding is successful as evaluated at operation 504, at operation 506 the UE uses this information to identify the resource element group pattern allocation inside the PDCCH symbol, e.g., referred to as PDCCH-RNTI or DCI-PDCCH-RNTI, which is common such that any UE can decode this DCI. In this example, consider that the defined PDCCH-RNTI is present, whereby the operations continue at operation 602 of FIG. 6.

By using the known allocation pattern, the UE decodes the UE-specific DCI data using the UE's specific RNTI. As represented by operation 602 of FIG. 6, only the allocated subgroup of the possible resource element group need be scanned, not the entire possible space for such resource element groups.

If at operation 604 the decoding of UE-specific information is successful, operation 606 finds the unused resource element group location(s) via the PDCCH symbol using DCI-PDCCH-RNTI and the resource block used for PDSCH; this includes operation 606 using the UE-specific DCI to determine the actual resource block(s) occupied by PDSCH on (what is otherwise) a PDCCH symbol. Note that if decoding is not successful, the process ends, likely because a bases station transmission/UE reception error or the like occurred and needs to be reattempted; (error mitigation is not described herein).

In this example, decoding is successful, and thus operation 608 checks if the PDCCH symbol is used for PDSCH allocation. If the PDCCH symbol is included, operation 608 finds the unused resource element group on the PDCCH symbol using the DCI-PDCCH-RNTI, and the resource block used for PDSCH using DCI-UE-specific information. These two pieces of information can be used to determine the actual resource block(s) occupied by PDSCH on a PDCCH symbol. With this information, operation 610 performs rate matching and PDSCH decoding with the correct PDSCH resource block information to decode data successfully.

Returning to operation 504 of FIG. 5, if the DCI-PDCCH-RNTI failed (e.g., as it would with respect to slot 1 in FIG. 4), this indicates that the gNodeB did not transmit the predefined DCI. Thus, at operation 508, the UE proceeds with blind decoding to find the UE-specific PDCCH (as in the same way the existing system now operates). In this way, the gNodeB can decide to transmit predefined DCI when it is required to transmit PDSCH-consuming (otherwise) unused PDCCH resource element group(s). The additional gNodeB can place this predefined DCI in the first CCE and fixed aggregation level, for example, so that every UE can decode this message quickly, which helps in decoding other UE-specific DCI and other common DCI (e.g., SI-RNTI, P-RNTI, and the like).

By way of example, the following shows some practical results achieved via the technology described herein. Consider the following scenarios:

Number of resource block used=Aggregation level*6;

Aggregation level={1, 2, 4, 8, 16}

Resource block={6, 12, 24, 48, 96}

AL16*8 candidates, this is 128 CCEs (768 RBs), which is 256*3 symbols.

the maximum per coreset is 270*3=810 RB's for 100 Mhz.

100 MHz channel has 273 resource blocks in total.

For assessment, consider that one symbol of 270 resource blocks is assigned for the PDCCH CORESET. Note that the assigning of the number of resource block for PDCCH happens at initialization time, when the UE's attach to network, and it cannot be controlled in every slot level in the current 5G NR standard.

Consider a slot in which two user equipment are scheduled with aggregation level 4 and 8. Based on the current 5GNR standard, the gNodeB cannot change the number of resource blocks used on a slot level basis.

$$\text{Number of resources block used} = (4*6) + 8*6) = 72.$$

$$\text{Unused } RB's = 273 - 72 = 201.$$

In a "worst" case, assume that additional DCI consumes 16*6=96 resource blocks. Thus, the number of resource blocks saved in the current slot=201−96=105. Accordingly, 105 resource blocks can be used in current slot to schedule data for the UEs. Depending on each slot's occupancy, the number of resource blocks saved per slot varies. Note, for example that in the above calculation, it is assumed that the specifically-defined DCI consumes 16 (aggregation level)*6 (REG)=96 resource blocks. Logically only two UEs are scheduled, one with aggregation level 4 and the other with aggregation level 8, which means both UE are capable of decoding aggregation level 8; hence the specifically-defined DCI can be scheduled with an aggregation level of 8, whereby the total saving will be 153 resource blocks.

The additional DCI for the DCI-RNTI is not to any specific UE, instead being a common DCI, which any UE can decode. If there is no (or insignificant) saving for a given slot with respect to unused DCI resource blocks, the gNodeB can choose to not insert this additional DCI, and the system will work in the current way; that is, no UEs are affected by not transmitting the special DCI.

One or more aspects can be embodied in a user equipment, such as represented in the example operations of FIG. 7, and for example can include a memory that stores computer executable components and/or operations, and a processor that executes computer executable components and/or operations stored in the memory. Example operations can include operation 702, which represents determining, based on a defined physical downlink control channel-radio network temporary identifier obtained from a base station, whether resource element group pattern allocation information is present in a predefined downlink control information symbol location of a symbol. Example operation 704 represents, in response to the determining that the defined physical downlink control channel-radio network temporary identifier is present in the predefined downlink control information symbol location, identifying, based on the information within the predefined downlink control information symbol location, a candidate resource element group pattern allocation space, and scanning the candidate resource element group pattern allocation space to obtain downlink control information that is specific to the user equipment within the resource element group pattern allocation space, without scanning a full resource element group pattern allocation within an entire possible resource element group pattern allocation space.

Further operations can include, in response to the determining that the defined physical downlink control channel-radio network temporary identifier is present, determining whether the physical downlink control channel symbol is used for physical downlink shared channel allocation, and in response to determining that the physical downlink control channel symbol is used for physical downlink shared channel allocation, locating at least one resource element group on the physical downlink control channel symbol, based on the downlink control information-physical downlink control channel-radio network temporary identifier and the downlink control information, that is not used for resource element group pattern allocation data, and that can include a resource block specific to the user equipment that is occupied by physical downlink shared channel data.

Determining whether the defined physical downlink control channel-radio network temporary identifier is present in the predefined downlink control information symbol location can include attempting to decode downlink control information into information directed to the user equipment.

Further operations can include performing rate matching and physical downlink shared channel decoding with physical downlink shared channel resource blocks to decode downlink shared channel data.

The predefined downlink control information symbol location can include a control channel element at predefined location within the symbol.

The predefined downlink control information symbol location within the symbol corresponds to a lowest location within the symbol.

A fixed aggregation level can be defined for predefined downlink control information of the predefined downlink control information symbol location.

The predefined downlink control information symbol location can include a control channel element at predefined location within the symbol, and wherein a fixed aggregation level is defined for predefined downlink control information of the predefined downlink control information symbol location.

Further operations can include, in response to determining that the defined physical downlink control channel-radio network temporary identifier is not present in the predefined downlink control information symbol location, performing blind decoding of the entire possible resource element group space to determine user equipment-specific physical downlink control channel information.

The base station can include a gNodeB.

Figure 8:
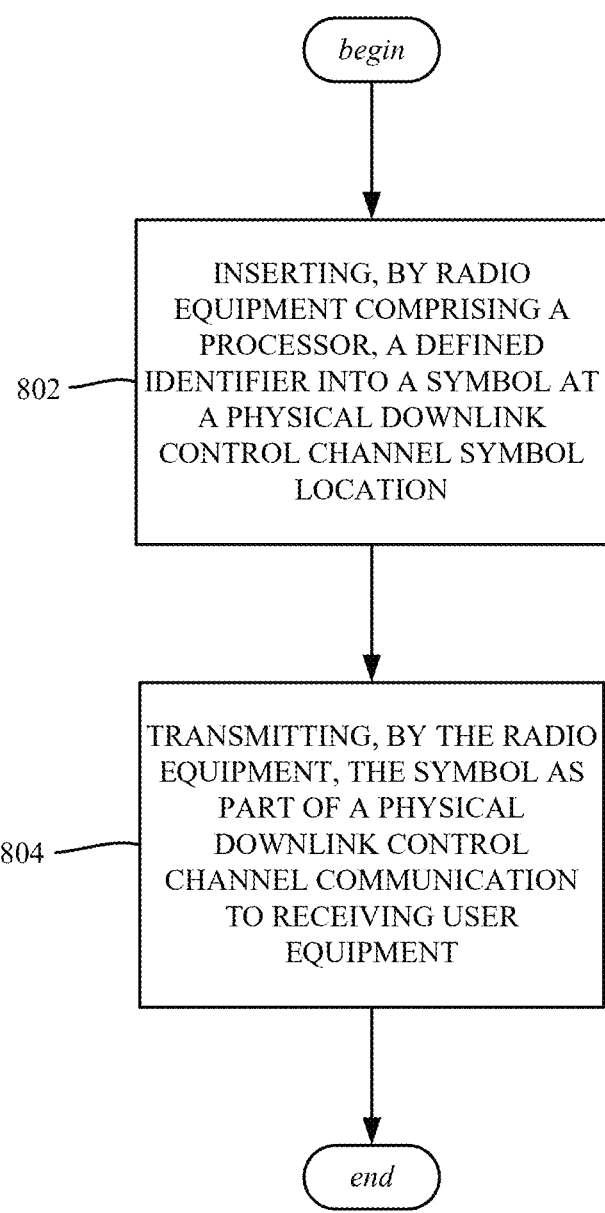
FIG. 8 is a flow diagram showing example operations related to radio equipment inserting a defined identifier into a symbol at a physical downlink control channel symbol location and transmitting the symbol as part of a physical downlink control channel communication, in accordance with various aspects and implementations of the subject disclosure.

One or more example aspects, such as corresponding to example operations of a method, are represented in FIG. 8. Example operation 802 represents inserting, by radio equipment comprising a processor, a defined identifier into a symbol at a physical downlink control channel symbol location. Example operation 804 represents transmitting, by the radio equipment, the symbol as part of a physical downlink control channel communication to receiving user equipment.

Further operations can include adding, by the radio equipment based on the symbol at the symbol location, information to the symbol describing resource element group pattern allocation space applicable to a specified user equipment.

The specified user equipment can be a first user equipment, wherein the information is first information, wherein the resource element group pattern allocation space is a first resource element group pattern allocation space, and further operations can include adding, by the radio equipment based on the symbol at the symbol location, second information to the symbol describing a second resource element group pattern allocation space applicable to a second user equipment, the second resource element group pattern allocation space being different from the first resource element group pattern allocation space.

Further operations can include determining, by the radio equipment, an unused resource element group space with the symbol, and allocating, by the radio equipment, the unused resource element group space for physical downlink shared channel data scheduling.

The defined identifier radio network temporary identifier can be common to any of the receiving user equipment, and transmitting the symbol as part of the physical downlink control channel communication can include broadcasting the symbol as part of a slot to the receiving user equipment.

The symbol at the symbol location can be in a first slot; further operations can include determining, by the radio equipment, to not insert the defined identifier into a second symbol of a second slot.

FIG. 9 summarizes various example operations, e.g., corresponding to a machine-readable medium, comprising executable instructions that, when executed by a processor of a user equipment, facilitate performance of operations. Example operation 902 represents scanning a symbol of a slot received via transmission from a base station to determine whether the symbol comprises a defined identifier at a predefined downlink control channel symbol location. Example operation 904 represents, in response to determining that the symbol comprises the defined identifier at the predefined downlink control channel symbol location, determining, based on information in the predefined symbol location, a subgroup of resource element group pattern allocation space in use for downlink control information, and scanning the subgroup of the resource element group pattern allocation space to obtain downlink control information that is specific to the user equipment within the resource element group pattern allocation space, without scanning an entire resource element group pattern allocation within possible resource element group pattern allocation space.

In response to determining that the defined identifier is not present in the predefined downlink control channel symbol location, further operations can include performing blind decoding of the entire possible resource element group space to determine user equipment-specific physical downlink control channel information.

Further operations can include, in response to the determining that the defined identifier is present in the predefined downlink control channel symbol location, determining whether the physical downlink control channel symbol is used for physical downlink shared channel allocation, and in response to determining that the physical downlink control channel symbol is used for physical downlink shared channel allocation, locating at least one resource block specific to the user equipment within the symbol that is occupied by physical downlink shared channel data. Further operations can include obtaining physical downlink shared channel data from the at least one resource block, comprising performing rate matching and physical downlink shared channel decoding.

As can be seen, the technology described herein facilitates partial blind decoding, which further facilitates the use of PDSCH scheduling on a PDCCH symbol. A defined DCI including a DCI-identifier at a predefined location can be used to narrow the scanning/decoding space of UEs relative to fully blind decoding. The partial blind decoding and the unused resource element group (for PDCCH) can be used to perform rate matching properly to enable PDSCH data on what is otherwise reserved as a PDCCH symbol.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
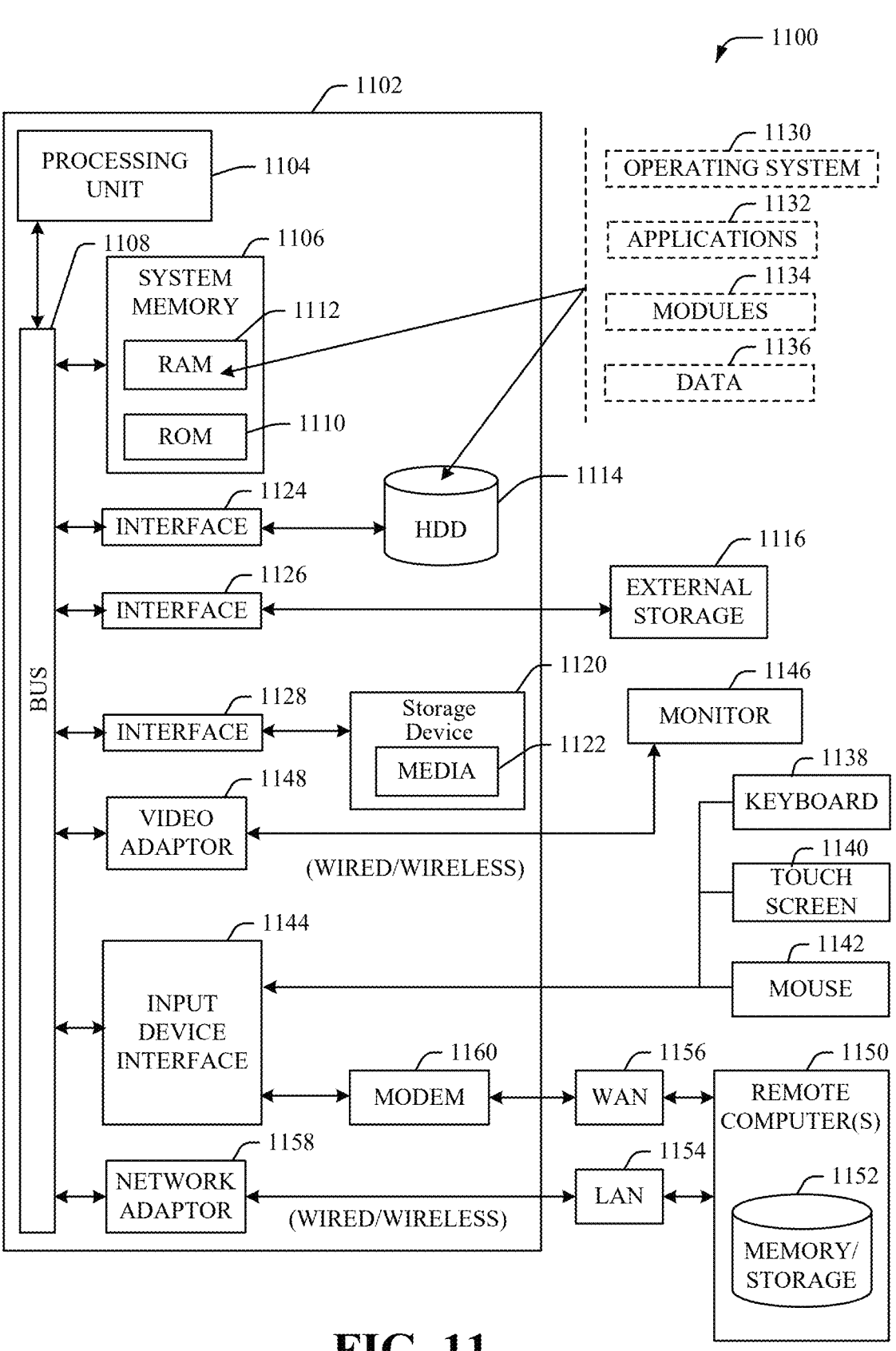
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules

1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/ wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modified and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A user equipment, comprising:
at least one processor; and
at least one memory that stores executable instructions that, when executed by the at least one processor, facilitate performance of operations, the operations comprising:
    determining, based on a defined physical downlink control channel-radio network temporary identifier obtained from a base station, whether resource element group pattern allocation information is present in a predefined downlink control information symbol location of a symbol; and
    in response to the determining that the defined physical downlink control channel-radio network temporary identifier is present in the predefined downlink control information symbol location, identifying, based on the information within the predefined downlink control information symbol location, a candidate resource element group pattern allocation space, and scanning the candidate resource element group pattern allocation space to obtain downlink control information that is specific to the user equipment within the candidate resource element group pattern allocation space, without scanning a full resource element group pattern allocation within an entire possible resource element group pattern allocation space.

2. The user equipment of claim 1, wherein the operations further comprise, in response to the determining that the defined physical downlink control channel-radio network temporary identifier is present, determining whether the symbol is used for physical downlink shared channel allocation, and in response to determining that the symbol is used for physical downlink shared channel allocation, locating at least one resource element group on the symbol, based on a downlink control information-physical downlink control channel-radio network temporary identifier and the downlink control information, that is not used for resource element group pattern allocation data, and that comprises a resource block specific to the user equipment that is occupied by physical downlink shared channel data.

3. The user equipment of claim 1, wherein the determining of whether the defined physical downlink control channel-radio network temporary identifier is present in the predefined downlink control information symbol location comprises attempting to decode the downlink control information into information directed to the user equipment.

4. The user equipment of claim 1, wherein the operations further comprise performing rate matching and physical downlink shared channel decoding with physical downlink shared channel resource blocks to decode downlink shared channel data.

5. The user equipment of claim 1, wherein the predefined downlink control information symbol location comprises a control channel element at predefined location within the symbol.

6. The user equipment of claim 1, wherein the predefined downlink control information symbol location within the symbol corresponds to a lowest location within the symbol.

7. The user equipment of claim 1, wherein a fixed aggregation level is defined for predefined downlink control information of the predefined downlink control information symbol location.

8. The user equipment of claim 1, wherein the predefined downlink control information symbol location comprises a control channel element at predefined location within the symbol, and wherein a fixed aggregation level is defined for predefined downlink control information of the predefined downlink control information symbol location.

9. The user equipment of claim 1, wherein the operations further comprise, in response to determining that the defined physical downlink control channel-radio network temporary identifier is not present in the predefined downlink control information symbol location, performing blind decoding of an entire possible resource element group space to determine user equipment-specific physical downlink control channel information.

10. The user equipment of claim 1, wherein the base station comprises a gNodeB.

11. A non-transitory machine-readable medium, comprising executable instructions that, when executed by at least one processor of a user equipment, facilitate performance of operations, the operations comprising:
    scanning a symbol of a slot received via transmission from a base station to determine whether the symbol comprises a defined identifier at a predefined symbol location; and
    in response to determining that the symbol comprises the defined identifier at the predefined symbol location, determining, based on information in the predefined symbol location, a subgroup of resource element group pattern allocation space in use for downlink control information, and scanning the subgroup of the resource element group pattern allocation space to obtain the downlink control information that is specific to the user equipment within the resource element group pattern allocation space, without scanning an entire resource element group pattern allocation within possible resource element group pattern allocation space.

12. The non-transitory machine-readable medium of claim 11, wherein the operations further comprise, in response to determining that the defined identifier is not present in the predefined symbol location, performing blind decoding of an entire possible resource element group space to determine user equipment-specific physical downlink control channel information.

13. The non-transitory machine-readable medium of claim 11, wherein the operations further comprise, in response to the determining that the defined identifier is present in the predefined symbol location, determining whether the symbol is used for physical downlink shared channel allocation, and, in response to determining that the symbol is used for physical downlink shared channel allocation, locating at least one resource block specific to the user equipment within the symbol that is occupied by physical downlink shared channel data.

14. The non-transitory machine-readable medium of claim 13, wherein the operations further comprise obtaining physical downlink shared channel data from the at least one resource block, comprising performing rate matching and physical downlink shared channel decoding.

15. A method, comprising:

determining, by a user equipment comprising at least one processor, based on a defined physical downlink control channel-radio network temporary identifier obtained from a base station, whether resource element group pattern allocation information is present in a predefined downlink control information symbol location of a symbol; and in response to the determining that the defined physical downlink control channel-radio network temporary identifier is present in the predefined downlink control information symbol location, identifying, by the user equipment, based on the information within the predefined downlink control information symbol location, a candidate resource element group pattern allocation space, and scanning, by the user equipment, the candidate resource element group pattern allocation space to obtain downlink control information that is specific to the user equipment within the candidate resource element group pattern allocation space, without scanning a full resource element group pattern allocation within an entire possible resource element group pattern allocation space.

16. The method of claim 15, further comprising, in response to the determining that the defined physical downlink control channel-radio network temporary identifier is present, determining, by the user equipment, whether the symbol is used for physical downlink shared channel allocation, and in response to determining that the symbol is used for physical downlink shared channel allocation, locating, by the user equipment, at least one resource element group on the symbol, based on a downlink control information-physical downlink control channel-radio network temporary identifier and the downlink control information, that is not used for resource element group pattern allocation data, and that comprises a resource block specific to the user equipment that is occupied by physical downlink shared channel data.

17. The method of claim 15, wherein the determining of whether the defined physical downlink control channel-radio network temporary identifier is present in the predefined downlink control information symbol location comprises attempting to decode the downlink control information into information directed to the user equipment.

18. The method of claim 15, further comprising performing, by the user equipment, rate matching and physical downlink shared channel decoding with physical downlink shared channel resource blocks to decode downlink shared channel data.

19. The method of claim 15, wherein the predefined downlink control information symbol location comprises a control channel element at predefined location within the symbol.

20. The method of claim 15, wherein the predefined downlink control information symbol location within the symbol corresponds to a lowest location within the symbol.

* * * * *